United States Patent [19]
van Hardeveld et al.

[11] 3,886,109
[45] May 27, 1975

[54] PROCESS FOR PREPARING A LATEX OF A RUBBERY POLYMER FROM A SOLUTION OF THIS POLYMER IN AN ORGANIC SOLVENT

[75] Inventors: Rudolf van Hardeveld, Geleen; Jozef L. M. van der Loos, Sittard, both of Netherlands

[73] Assignee: Stamicarbon, B. V., Geleen, Netherlands

[22] Filed: May 18, 1973

[21] Appl. No.: 361,619

[30] Foreign Application Priority Data
May 18, 1972 Netherlands .................. 7206711

[52] U.S. Cl. .......... 260/29.7 EM; 210/84; 210/512; 252/321; 252/349; 252/361; 260/29.6 PM; 260/29.6 PT; 260/29.7 PT
[51] Int. Cl. ... C08d 5/00; B01d 12/00; B01d 17/04
[58] Field of Search .......... 260/29.7 EM, 29.7 PT, 260/29.6 PT, 29.6 PM; 210/84, 512; 252/321, 349, 361

[56] References Cited
UNITED STATES PATENTS

| | | |
|---|---|---|
| 3,140,257 | 7/1964 | Wilder et al. .......................... 210/84 |
| 3,277,037 | 10/1966 | Halper et al. ................. 260/29.7 EM |
| 3,471,018 | 10/1969 | Sliepcevich et al. ................... 210/84 |
| 3,485,362 | 12/1969 | Spruyt et al. .......................... 210/84 |

*Primary Examiner*—Morris Liebman
*Assistant Examiner*—T. DeBenedictis, Sr.
*Attorney, Agent, or Firm*—Cushman, Darby & Cushman

[57] ABSTRACT

A latex of a rubbery polymer material is produced from a solution of said polymer in an organic solvent by mixing the solution with water, evaporating the solvent, subjecting the obtained foamy product to the shear forces generated in a radial symmetrical space caused by injecting into the space, tangentially to the foam therein, a flow of gas or liquid. The treated foam includes the rubbery polymer, water, an organic solvent and at least one emulsifying agent. When subjected to shear forces, the foam breaks releasing the gaseous organic solvent which is removed from the obtained latex.

15 Claims, 6 Drawing Figures

PROCESS FOR PREPARING A LATEX OF A RUBBERY POLYMER FROM A SOLUTION OF THIS POLYMER IN AN ORGANIC SOLVENT

BACKGROUND OF THE INVENTION

This invention relates to a process for preparing a latex of a rubbery polymer from a solution of this polymer in an organic solvent, by emulsifying the polymer solution in water and evaporating the organic solvent and separating the solvent in the gaseous state.

According to well-known methods, many rubbery polymers can be prepared by an emulsion polymerization, in which the rubbery polymer is obtained as an aqueous emulsion. From aqueous emulsions of this type, it is possible to prepare latices almost directly by removing the unconverted monomer and, if so desired, part of the water from the latice, for example by flash evaporation.

In the last decade, the preparation of rubbery polymers by polymerization in solution has gained increasing commercial significance, particularly through the development of rubbery polymers from two or more $\alpha$-alkenes and, if so desired, one or more non-conjugated dienes such as copolymers and terpolymers based on ethene and propene and/or butene-1, stereospecific polymers from conjugated dienes, and block copolymers of the general formula A-B or A-B-A, where A is a non-elastomeric polymer block and B an elastomeric polymer block. In polymerizations of this type, the rubbery polymer is obtained as a solution in a solvent, the solvent usually being organic.

It is, of course, possible to prepare latices from these polymer solutions by the method commonly used for emulsion polymers. To render the polymers obtained by polymerization in solution suitable for applications in which it is desired, or even required, to have latices of these polymers, there have been suggestions made of ways of preparing latices directly from organic solvent polymer solutions.

To prepare latices of rubbery polymers from solutions of these polymers in organic solvents, it has already been proposed to disperse the polymer solutions in water and to remove the organic solvent from the dispersion by evaporation. However, as a practical matter a process of this type cannot be used as such for several reasons. The emulsification of the polymer solution in water normally requires a considerable amount of emulsifier and the presence of this emulsifier makes it very difficult to evaporate and remove the solvent. When the solvent is evaporated, a very large amount of a foam that is stable under the evaporation conditions is formed at the surface of the aqueous emulsion, so that an efficient and rapid separation of the evaporated solvent and the liquid phase is suppressed. This requires large surface areas for evaporation in order to obtain a sufficiently rapid separation of the gaseous solvent, so that such a process cannot readily be used on a commercial scale.

It has further been proposed to improve the separation of gaseous solvent and liquid phase and the attendant foam problem by adding to the aqueous emulsion compounds suppressing the formation of foam, or to break up the foam formed during the evaporation of the organic solvent by mechanical means such as with stirrers. In a similar manner, these methods, too, present practical problems. For example, many of the compounds proposed to suppress the formation of foam are harmful to the properties of the final latices and are hence unacceptable. Breaking up the resulting foam by mechanical foam breakers presents problems caused by the low mechanical stability of aqueous emulsions of rubbery polymers. If too great of a mechanical force is applied in such a method, the rubbery polymer coagulates. On the other hand, if only a slight mechanical force is used as is needed to avoid coagulation, the effect obtained by such a method is insufficient for commercial application.

DETAILED DESCRIPTION OF THE INVENTION

The inventors in the present case have now found a process for preparing a latex of a rubbery polymer from a solution of such a polymer in an organic solvent, by emulsifying the polymer solution in water and evaporating and separating the organic solvent, and particularly by evaporating and removing the organic solvent such that a foamy product is formed from virtually the total amount of emulsion components. The process is further characterized in that the solvent is separated from the foamy product in the gaseous state by passing the foamy product into a radially symmetrical space in which a rotary flow is produced by means of a gas and-/or vapor flow.

The starting products used in the process according to the present invention include a wide number of polymer solutions of rubbery polymers contained in an organic solvent. Solutions of this type preferably contain about 10 to 250 grams of polymer per liter of organic solvent, although higher and lower amounts may be used. Most preferably, however, the solution will contain 50 to 150 grams of polymer per liter of solvent. The manner of production of such a solution is of no particular importance to the features of the present invention. For example, it is possible to start the process from a polymer solution obtained by solution polymerization or from a solution obtained by absorbing a rubbery polymer in an organic solvent. For practical reasons, however, we prefer to commence the process with a polymer solution obtained by polymerization in solution, as a large number of suitable rubber like polymers are produced directly and are readily used from solution without the need for separate, additional processing steps prior to separation according to the process herein. As another embodiment and as indicated above the rubbery polymer of the type described below may have been dissolved in any common solvent well known to the art. Examples of such solvents include lower alkanes, cycloalkanes or alkenes all having preferably 3 to 12 carbon atoms per molecule, such as illustrated by the more common solvents propane, butane, pentane, propene, heptene, hexane, heptane, benzene, and cyclohexane. Mixtures of solvents are also useful such as is illustrated by technical-grade gasoline; moreover such technical-grade solvents are relatively inexpensive. The solvent may also contain, and preferably does contain, one or more halogen atoms per molecule, such as trichloroethane, among others. Most preferably the solvent used has a boiling point of below 90°C. It will be appreciated that the foregoing solvents are all of the same type of, if not identical to, the organic solvents in which the polymers are contained directly upon manufacture, as described in the above embodiment.

In the process according to the invention, all types of rubbery polymers may be used, provided only that they can be put into a solution. Such polymers include homopolymers as well as copolymers, block copolymers and graft polymers. More specific examples of suitable rubbery polymers are stereospecific polymers of conjugated dienes, such as isoprene or butadiene, as disclosed in U.S. Pat. Nos. 3,317,918 and 2,979,494, or copolymers of these dienes with monovinyl-aromatic compounds, such as styrene as disclosed in U.S. Pat. Nos. 2,975,160 and 3,297,793; copolymers of conjugated dienes with acrylonitrile; and rubbery copolymers of ethene, at least one other $\alpha$-alkene and, if so desired, one or more polyenes, such as rubbery ethene/propene copolymers and terpolymers or halogen-containing derivatives, of such copolymers as disclosed in U.S. Pat. Nos. 3,211,709 and 3,000,866. Some examples of polyenes which may be incorporated in such copolymers are hexadiene-1,4, dicyclopentadiene, 5-alkylidene-norbornenes-2, such as 5-ethylidene-norbornene-2 and 5-propylidene-norbornene-2, cyclooctadiene and the like.

As the rubbery polymer there may also be used elastomeric block copolymers of the general formula A-B or A-B-A, where A is a non-elastomeric polymer block, such as styrene or $\alpha$-methyl styrene; and B, an elastomeric polymer block, for example, a conjugated diene such as isoprene or butadiene.

The emulsification of the polymer solution is effected by bringing the polymer solution in contact with water and, if so desired, one or more emulsifiers. The exact nature of the emulsifier is not particularly important to the process as long as a rich foam is produced. These emulsifiers may be anionic, cationic, or non-ionic. It is also possible to use two or more emulsifiers, for example, two emulsifiers from the same or different classes as mentioned above such as an anionic and a non-ionic emulsifier.

There are a host of acceptable emulsifiers and the following is merely illustrative. Some examples of anionic emulsifiers that can be used are the sodium or potassium salts of higher fatty acids or resin acids, such as, for example, oleic acid, palmitic acid, stearic acid, lauric acid, myristic acid, arachidic acid, ricinic acid and similar acids. The sulphates and sulphonates of these higher fatty acids, such as sodium lauryl sulphate and sodium lauryl sulphonate are also useful. Examples of cationic emulsifiers are, among others, amino acids such as tridecylbenzenehydroxyethylimidazolechloride and stearyldimethylbenzylammoniumchloride.

Some examples of non-ionic emulsifiers include the surface-active condensation products of about 3–15 moles of ethylene oxide with an organic compound containing an active hydrogen bound to oxygen or nitrogen atoms, preferably alkyl phenols with 1–3 alkyl substituents, all as disclosed in U.S. Pat. Nos. 1,970,578; 2,174,761; 2,213,477; and 3,156,655, the disclosures of which compounds are incorporated herein by reference. Other materials include the phosphoric esters of higher alcohols, such as capryl and octyl alcohol, monoesters of oleic acid and pentaerythritol, such as sorbitol monoleate and the like.

The amount of emulsifier that is used depends on a number of conditions, such as the nature and the concentration of the polymer solution used. The amounts generally used range between about 1 and 40 parts emulsifier per 100 parts of polymer, although higher and lower amounts may be used depending upon particular conditions. Optimum amounts mostly range between 3 and 15 parts per 100 parts of polymer.

The amount of water that can be used for the emulsification is also subject to variation, but always a sufficient amount to cause adequate foaming usually the amount ranges between 40 and 300 parts per 100 parts of polymer solution. It is possible, however, to use larger amounts of water.

The polymer solution, the water, and the emulsifiers, if any, are brought into contact in any convenient manner. An excellent method for this purpose is the use of a homogenizer or a device of the Ultra-Turrax type, although other such mixing and homogenizing devices may be used.

The rubbery polymer emulsion prepared in the above manner is then converted into the prepared foamy product, if so desired, after first having been whipped into a cream. The foamy product is prepared by evaporation of the solvent.

In order to evaporate the organic solvent, the emulsion may be heated or subjected to a decrease of the pressure. It is also possible to use a combination of both methods such as a heating treatment followed by lowering the pressure. The evaporation of the organic solvent may be carried out in any appropriate device. For instance, the solvent may be evaporated by means of a heat-exchanger which may, if so desired, have been fitted with pipes, plates or baffles to enlarge the heat-exchanging area.

The time needed to form an acceptable foamy product from virtually the total amount of emulsion components depends upon a great many factors; among these are the nature of the organic solvent used, the viscosity of the emulsion, the temperature and/or the pressure at which the foam formation is carried out, and the particular type of equipment used for this purpose, and can, therefore, not be indicated within a specific time frame that will be accurate and consistent for all conditions. The skilled operator will be able to determine these factors and in a direct manner formulate through proper adjustment, the appropriate foamy product.

Conditions may be such that in this foam-producing treatment not all of the organic solvent is removed from the polymer. The colloidal polymer particles will then be highly swollen and form a slimy product. This formation of slime can be prevented or substantially completely suppressed by carrying out the foam-producing treatment in the presence of one or more compounds that suppress the formation of slime, such as, e.g., organic oxygen compounds like the lower alkanols, i.e., 2–8 carbon atoms and specifically isopropanol. These compounds are conveniently added before, and/or during the foam formation.

The organic solvent is separated from the foamy product in the process according to the present invention by passing the foamy product into a radially symmetrical space in which a rotary flow is produced by means of a gas or vapor flow. The radially symmetrical space is illustrated in the drawings in detail and is explained and described below. Generally, the space provides for flow of the foamy organic-solvent laden product into the space of chamber at a first axis and is impinged upon by one or more flows of a gas or vapor or mixture of the two, the flow being injected and directed both perpendicular and tangential to the axis of flow of the foamy product. Means are also provided in or communicated to the space for removal of the separated organic solvent usually in the vapor phase, and the separated rubber latice. This tangential flow generates shear forces in the space which break up the foam allowing the organic solvent to be removed.

In order to separate the gaseous organic solvent from the foamy product in the manner described there may be used, in principle, any arbitrary gas, vapor of gas - vapor mixture flow. Thus, it is possible to use among others gas flows of air, nitrogen, carbonic acid gas, and other inert gases and vapor flows of steam, organic solvents, and the like. Preferably, however, a flow of gaseous organic solvent that is identical to the solvent in which the rubbery polymer has been dissolved is used, since inventors have found that caking and adhering of the rubbery polymer to the apparatus that is used will then be minimal.

The rate at which the gas and/or vapor flow is blown or injected into the radially symmetrical space in order to produce shear forces that are sufficiently large to break up the foam depends on many factors, several of which are interrelated, such as the dimensions of the radially symmetrical space, the viscosity of the foamy product, and the temperature at which the process is conducted. In many cases a gas rate of the order of about 30 meters per second will be sufficient to break the foam. The skilled operator can readily determine the gas rates needed to break up the foam.

The gas and/or vapor flow that is used to maintain the rotary flow in the radially symmetrical space should preferably have a temperature equal to or higher than the boiling point of the organic solvent in which the rubbery polymer was dissolved in order to prevent condensation of the solvent vapor in the foamy product prior to the separation. As previously indicated, the preferred solvents employed have a boiling point below about 90°C. There is also another factor to consider in the discussion of flow temperature. If the slime formation is suppressed by means of an organic oxygen compound which forms an azeotrope with the organic solvent, and possibly, water, such as a lower alkanol, the temperature is preferably equal to or higher than the boiling point of such an azeotrope.

The aqueous latex obtained after separation of the organic solvent in the radially symmetrical space still contains an amount of organic solvent in most cases. This can be removed from the product in a simple way, such as by using a recycle or film evaporator or by careful evaporation in a well stirred vessel. It is also possible to free the resulting aqueous latex of traces of solvent by subjecting it again to a foam treatment and then passing it into a rotation-symmetrical space. If the latter method is used, the temperature may be several degrees higher than in the first treatment.

In the processes described for removing traces of organic solvent, the aqueous latex may also be concentrated to a certain extent by water evaporation. The removal of the last quantity of organic solvent need not be fully quantitative and depending upon the intended use of the latex a small amount of organic solvent is acceptable. Also, if desired, the aqueous latex product can be concentrated to a higher solids content, such as over 50 percent by weight, by centrifuging, by means of chemical agents, or by electrodecantation. Some examples of chemical agents that may be used for this purpose in a process known as "creaming" are hydroxyethyl cellulose, carboxymethyl cellulose, alginates, polyvinyl alcohol, polyacrylic acid, polyammonium acrylate, and polyethylene oxide. The serum layer formed in this process, that is the aqueous layer with a low content of dispersed polymer and a high content of thickener and emulsifier, may be recycled into the process at the emulsion formation stage.

The invention will now be further elucidated by the several embodiments shown in the following drawings, in which.

The following examples referring to one or more of the Figures herein will serve to describe the drawings while, at the same time, be a working example of conducting the process according to the invention.

Figure 1:
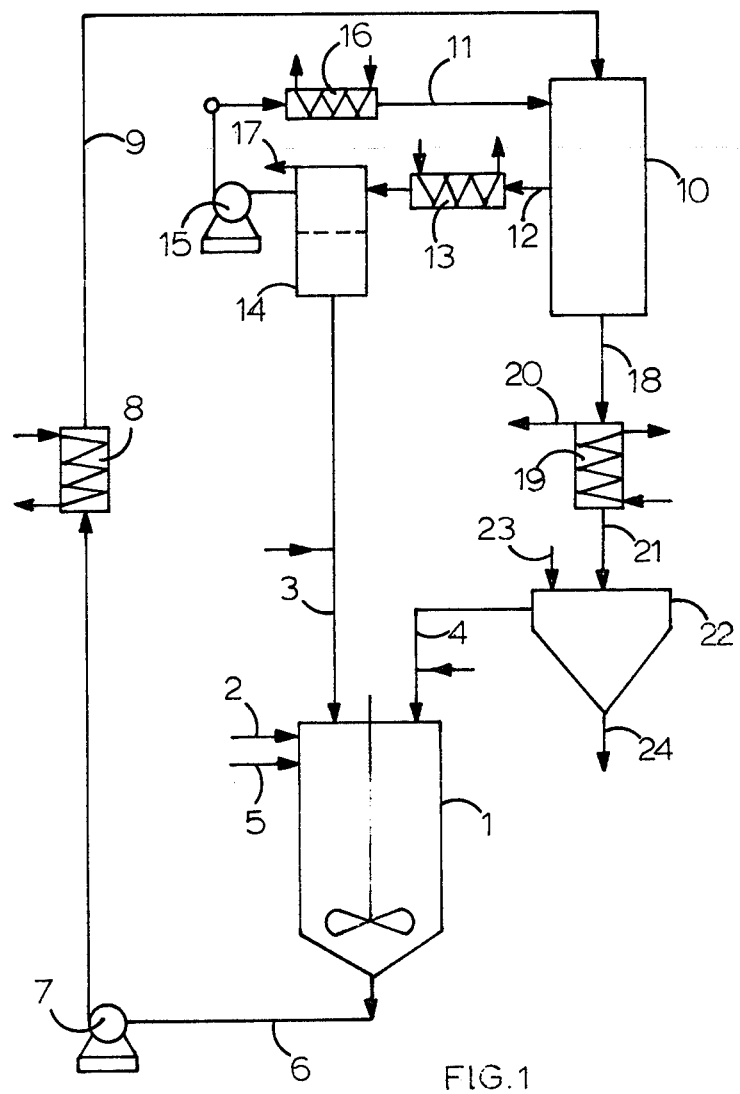
FIG. 1 is a schematic diagram of the preparation of the latex.
Figure 2:
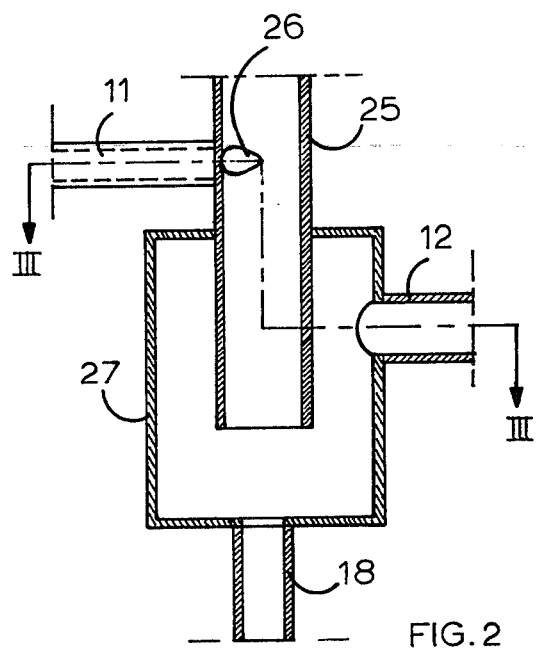
FIG. 2 is a longitudinal cross-sectional view through a cyclone separator useful in the process of the invention.
Figure 3:
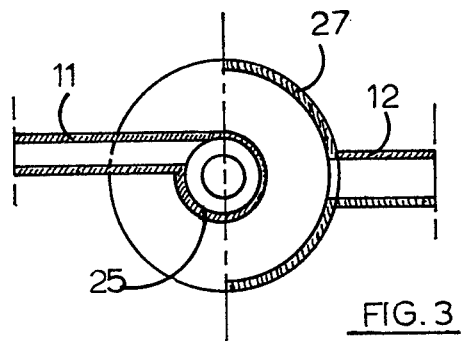
FIG. 3 is a cross-sectional view taken through the same cyclone along the line III—III in FIG. 2.

Example 1 — The Process Conducted As Shown in FIG. 1

Forty liters/hour of a rubber solution were fed to an emulsifying area 1 of the Ultra-Turrax type at conduit 2 and emulsified with 20 liters of water, 7.2 liters of isopropanol, 100 grams of an emulsifier known by the trade name of Antarox CO 710 (nonylphenoxypolyethyleneglycol), a non-ionic surfactant sold by GAF Corp., and 100 grams of an emulsifier known by the trade name of Duponol C, sodium Lauryl sulfate, U.S.P. grade, an anionic surfactant sold by DuPont. Water and isopropanol were added through conduit 3 and the emulsifier through conduit 4.

The rubber solution used was an ethene/propene/-dicyclopentadiene terpolymer, known by the trade name of Keltan 520, which was dissolved in gasoline having a boiling range of 62° to 82° C and which had a solids content of 50 grams per liter. To mask any catalyst residue in the terpolymer, 10 grams/hour of the sodium salt of ethylene-diamine tetra-acetic acid were also added through conduit 5. During the emulsification the pH was kept at 10 by appropriate addition of sodium hydroxide solution. The emulsion was drawn off through conduit 6 and, by means of pump 7, passed through a heat exchanger 8 whose wall temperature was maintained at about 75° C. Evaporation of the gasoline as a ternary azeotrope with isopropanol and water caused the formation of a foamy product having a temperature of about 66° C, which was passed into the center of a cyclone 10 through conduit 9. The cyclone used was of the type shown in more detail in FIG. 4. A rotary flow in the cyclone was produced by passing a vapor flow consisting of a mixture of about 94 parts by volume of gasoline and about 6 parts by volume of isopropanol and having a temperature of 76° C, the vapor flow being tangentially injected into the cyclone through conduit 11. The gas rate of this vapor flow was 30 meters/second. A diluted latex still containing 10% by weight of the volatile material originally present was removed from the cyclone and also a vapor flow of gasoline, isopropanol, and water. This vapor flow was discharged through conduit 12 and passed through a cooler 13, after which it was separated in a separator 14 in an aqueous phase consisting substantially of water and isopropanol, and an organic phase consisting substantially of gasoline and isopropanol. The water/isopropanol phase was recycled to the Ultra-Turrax through conduit 3, and the gasoline/isopropanol phase was discharged by means of pump 15, one part being recycled to the cyclone through evaporator 16 and conduit 11, and the other part being vented through conduit 17. The diluted aqueous latex was passed into a recycle evaporator 19 through conduit 18 in order to remove any residual volatile material. The volatile material was discharged through conduit 20 and the latex was passed into a creaming device 22 through conduit 21.

The creaming agent used was hydroxyethyl cellulose, which was fed to a creaming device at 23 in an amount of 1.75 grams per liter of diluted latex. The resulting serum layer, that is, the aqueous layer with a very low content of dispersed polymer and a high content of creaming agent and emulsifier, was recycled to the emulsifying device through conduit 4. The latex discharged at 24 had a solids content of 55% and did not contain any measurable amount of volatile components.

Example 2 — Series-Fed Cyclones

Example 1 was substantially repeated with the difference that no isopropanol was used. 40 liters/hour of rubber solution were emulsified with 27 liters of water, 100 grams of an emulsifier known by the trade name Duponol C, as described above, and 100 grams of an emulsifier known by the trade name of Antarox CO 710, also as identified above. Evaporation of the gasoline as a binary azeotrope with water formed a foamy product at a temperature of 68° C. To generate a rotary flow in the cyclone gasoline vapor at a temperature of 79° C. was used. A diluted latex still containing 50% by weight of the volatile material originally present was separated from the cyclone and this diluted latex was again passed to a following cyclone via a heat exchanger. Here a diluted latex was formed which contained hardly any volatile material; the diluted latex was then creamed as described in Example 1. The product obtained was a stable latex with a solids content of 56%.

FIGS. 2 through 6 show several exemplary embodiments of the cyclone used in the process according to the invention as illustrated above. The cyclone contains a cylindrical tube 25 into which the foamy product to be treated is fed axially. The wall of the tube is provided with an opening 26 to which a conduit 12 is connected in such a manner that, in operation, it causes a rotary flow in the tube 25 when a gaseous or vapor medium is fed in. The placement of the opening 26 with respect to the cylindrical axis of tube 25 is shown in more detail in FIG. 3. As illustrated, the opening 26 is offset from the axis of the tube 25 and follows the contour of the horizontal plane of the tube 25 and provides for a rotary flow within the tube as vapors or gas or a mixture thereof is tangentially supplied to tube 25, thereby subjecting the foamed product passing through the tube to shearing forces. The shear forces produced in this rotary flow break up the foam. The tube 25 discharges into a separation chamber or vessel 27 where the separation of the gaseous and liquid flows is effected.

The gaseous flow is discharged from the vessel through conduit 12 which is provided towards the upper portion of the separation vessel, and the liquid flows through conduit 18 which is provided at the bottom of the vessel.

Figure 4:
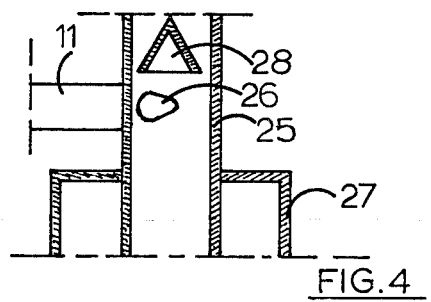
FIG. 4 is a longitudinal cross-sectional view through a modified cyclone embodiment.

In the embodiment shown in FIG. 4, the tube 25 is provided with a conical guide plate positioned in the center of the tube which guides the feed of foamy product along the inner wall of the tube and is tangentially contacted with the vapor flow issuing therefrom, before it passes feed opening 26. This ensures proper contact between the foam and the tangential gas and/or vapor flow.

Figure 5:
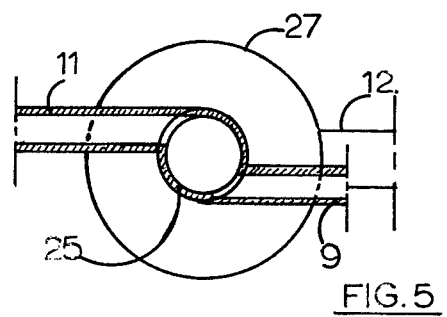
FIG. 5 is a cross-sectional view through another cyclone embodiment.
Figure 6:
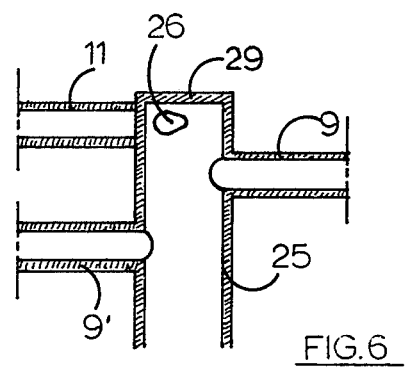
FIG. 6 is a longitudinal cross-sectional through still another cyclone embodiment.

In another embodiment, as shown in FIG. 5, both the vapor and the foamy product are passed tangentially into the tube 25 through conduits 9 and 11. The foamy product may be fed to the cylindrical tube 25 both axially and radially in one or several places, as is indicated in FIG. 6 by the conduits 9 and 9'. In this case tube 25 is closed at one end by means of a plate 29. Of course, there are other embodiments of the present invention, not specifically illustrated herein yet falling within the perview of the invention, that are also well suited for ensuring adequate mixing and foaming.

The obtained latex may be used in the same way as the known latices, for example, for the preparation of coating compositions, carpet backing, as adhesives and binding agents, for emulsion point preparation as a rubber basis for the graftpolymerisation of vinylmonomers into a impactresistant rubber modified polymer.

What is claimed is:

1. A process for preparing a latex of a rubbery polymer from a solution of said polymer in an organic solvent therefor comprising:
   a. mixing said rubbery polymer solution with water and at least one emulsifier therefor,
   b. evaporating said organic solvent such that a foamy product is formed from substantially the total amount of emulsion components,
   c. separating said organic solvent in the gaseous state from said foamy product by passing said foamy product into a radially symmetrical space while concurrently flowing tangentially against said foamy emulsion a gas, vapor or gas-vapor mixture fluid flow, thereby producing a rotary flow in said space and subjecting said foamy emulsion to sufficient shearing forces caused by said flow such that said foamy emulsion is broken and said organic solvent is released in a gaseous state;
   d. removing the gaseous organic solvent from said radially symmetrical space; and
   e. recovering a concentrated aqueous latex solution of said rubbery polymer.

2. The process according to claim 1 wherein said vapor fluid flow is a gaseous organic solvent.

3. The process according to claim 1 wherein said organic solvent is identical to the organic solvent in which the rubbery polymer has been dissolved.

4. The process according to claim 3 wherein said organic solvent has a boiling point of below 90° C.

5. The process according to claim 4 wherein said organic solvent is an aliphatic hydrocarbon having 3 to 12 carbon atoms per molecule or a mixture of said hydrocarbons.

6. The process according to claim 5 wherein said mixture of hydrocarbons is gasoline.

7. The process according to claim 1 wherein said gas fluid flow is nitrogen.

8. The process according to claim 1 wherein said vapor fluid flow is water vapor.

9. The process according to claim 1 wherein said rubbery polymer is a copolymer of ethene and at least one $\alpha$-alkene.

10. The process according to claim 9 wherein said copolymer additionally contains at least one polyene or a halogen-substituted polyene.

11. The process according to claim 10 wherein said copolymer is composed of ethene, propene, and butene-1 with dicyclopentadiene or a halogen derivative thereof containing 1 to 10 weight percent halogen.

12. The process according to claim 1 wherein said organic solvent-containing polymer solution contains from about 10 to about 250 grams of polymer per liter of organic solvent.

13. The process according to claim 12 wherein said organic solvent-containing polymer solution contains from about 50 to about 150 grams of polymer per liter of organic solvent.

14. The process according to claim 1 wherein a slime inhibiting amount of a lower alkanol is added prior to said organic solvent evaporation.

15. The process according to claim 14 wherein said lower alkanol is isopropanol.

* * * * *